June 17, 1924.

J. R. WILK

DENTURE PLATE 1,498,415

Original Filed Oct. 25, 1922   2 Sheets-Sheet 1

Witnesses:

Inventor:
Joseph R. Wilk
By Joshua H. Potts
His Attorney

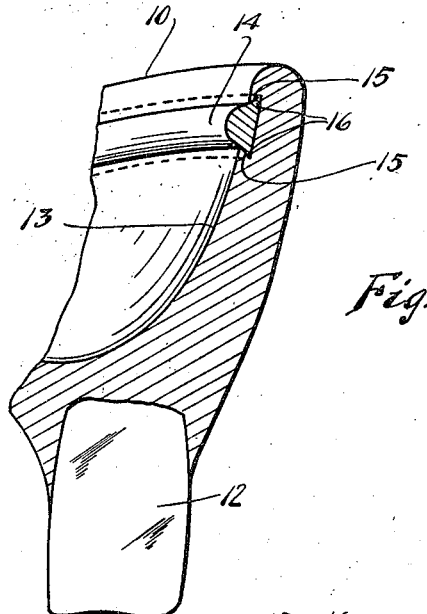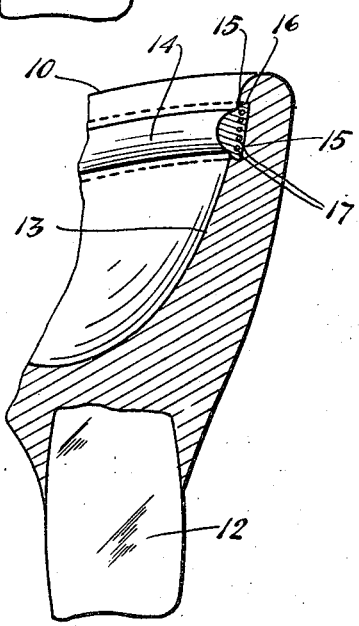

Patented June 17, 1924.

1,498,415

UNITED STATES PATENT OFFICE.

JOSEPH R. WILK, OF CHICAGO, ILLINOIS, ASSIGNOR TO WILK DENTAL LABORATORY, OF CHICAGO, ILLINOIS.

DENTURE PLATE.

Original application filed October 25, 1922, Serial No. 596,799. Divided and this application filed April 2, 1923. Serial No. 629,232.

*To all whom it may concern:*

Be it known that I, JOSEPH R. WILK, a citizen of the United States, and a resident of the city of Chicago, county of Cook, and State of Illinois, have invented certain new and useful Improvements in Denture Plates, of which the following is a specification.

This invention relates to denture plates, and has for its object the provision of a plate of this character, which is provided with cushioning means interposed between the plate and the gums of the wearer, such cushioning means being so arranged as to produce a powerful suction effect, even upon a poorly fitting plate, in order to properly retain the plate in position.

Another object of the invention is to provide a plate of this character of one material and employ in connection therewith cushioning means of yieldable material, together with means for fastening the cushioning means to the plate.

Other objects will appear hereinafter.

The invention consists in the combinations and arrangements of parts hereinafter described and claimed.

The invention will be best understood by reference to the accompanying drawings forming a part of this specification and in which, Fig. 1, is a top plan view showing the invention applied to the denture plate;

Fig. 4, is an enlarged fragmentary sectional view of the denture plate showing the invention applied thereto, and Fig. 5, is a view similar to Fig. 4, showing a slightly different form of the invention.

Figure 1:
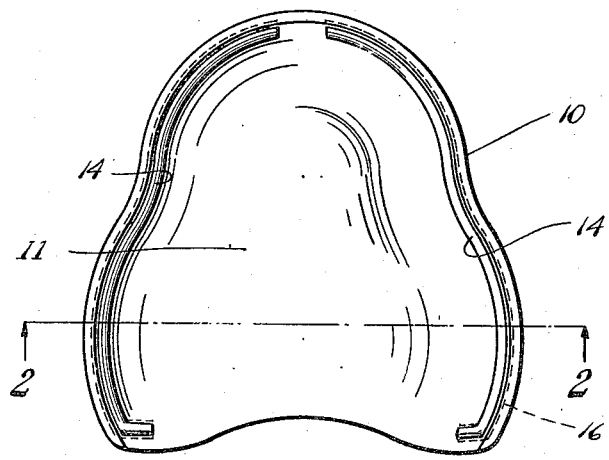
Figure 2:
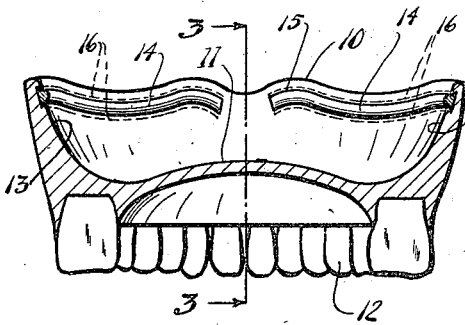
Fig. 2, is a section on the line 2—2 of Fig. 1.
Figure 3:
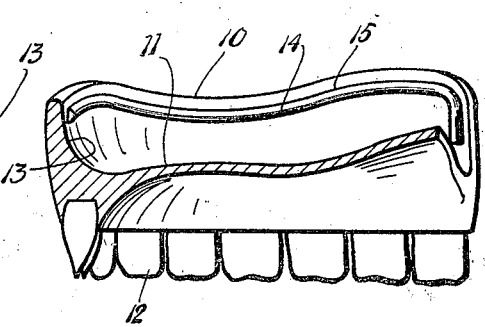
Fig. 3, is a section on the line 3—3 of Fig. 2.

Referring to the drawings, 10 represents a denture plate of any suitable material, such plate having a usual suction cavity 11, teeth 12 and the gum engaging surfaces 13, which in this instance are the inner sides of the edge walls of the cavity 11, as disclosed in my prior application for patent filed October 25, 1922, Serial No. 596,799, of which this application is a division.

Disposed along the gum engaging surfaces 13 in the proper position are yieldable means 14, preferably in the form of a rubber strip, as illustrated, such means preferably extending to a point adjacent each other at the forward end of the plate, extending rearwardly, conforming to the configuration of the plate as shown, and terminating adjacent the rear end thereof, although such yieldable means may extend entirely around the gum engaging surfaces of the plate, if desired.

Various yieldable means 14 may be employed and secured in position by any suitable fastening means, some of which are illustrated in my prior application aforesaid. In the preferred embodiment of the invention as herein contemplated, I provide the gum engaging surfaces 13 with grooves 15, which are preferably undercut in a suitable manner, and are shown as dove tailed in Figs. 4 and 5 of the drawings. The yieldable means are preferably half round in cross section, and provided with laterally projecting means, preferably in the form of a flange 16, adapted to be disposed in the groove 15, by this arrangement providing yieldable means which are securely held within the groove and upon the gum engaging surfaces 13 of the denture plate.

In order to provide a more secure fastening I preferably place a reinforcement in the portion of the yieldable means 14 which projects in the undercut notch, and this reforcement, in this instance, may take the form of a fabric 17, which stiffens the flange in such a manner that the same is difficult to withdraw from the groove, but at the same time permits the member to be forcibly withdrawn for the purpose of renewal or otherwise.

By the above described arrangement, means is provided for interposing cushioning means between the hard surfaces of ordinary suction denture plates and the gums of the wearer, the cushioning means at the same time greatly aiding and enhancing the suction efficiency of the plate.

While I have illustrated and described the preferred form of construction for carrying my invention into effect, this is capable of variation and modification without departing from the spirit of the invention.

I, therefore, do not wish to be limited to the precise details of construction set forth, but desire to avail myself of such variations and modifications as come within the scope of the appended claims.

Having described my invention what I claim as new and desire to secure by Letters Patent, is:

1. A denture plate including a suction cavity, said cavity having undercut grooves along its gum engaging surfaces; and cushioning means adapted to be mounted in said grooves, said cushioning means being provided with lateral projections for engagement with said undercut grooves.

2. A denture plate including a suction cavity having dove-tailed grooves along its gum engaging surfaces; and cushioning means adapted to be mounted in said grooves, said cushioning means having a dove-tailed portion adapted to fit in said grooves.

3. A denture plate including a suction cavity, the gum engaging inner walls of said cavity being provided with undercut grooves; cushioning means having laterally projecting portions adapted to fit in said grooves; and means for reinforcing said laterally projecting portions.

4. A denture plate including a suction cavity, the gum engaging inner walls of said cavity being provided with undercut grooves; and cushioning means having laterally projecting portions adapted to fit in said grooves; and means for reinforcing said laterally projecting portions, said reinforcing means including a fabric embedded in said cushioning means.

5. A denture plate, the gum engaging surfaces of which are provided with undercut grooves adjacent the peripheral edge; and cushioning means disposed in said grooves and forming a ridge on said surfaces, said cushioning means having integral edge flanges adapted to fit in said grooves.

6. A denture plate having dove-tailed grooves along its gum engaging surfaces, and cushioning means mounted in said grooves, said cushioning means having dove-tailed portions adapted to fit in said grooves.

In testimony whereof I have signed my name to this specification in the presence of two subscribing witnesses.

JOSEPH R. WILK.

Witnesses:
JOSHUA R. H. POTTS,
MARGARET AUER.